(12) United States Patent
Gupta

(10) Patent No.: US 12,081,543 B2
(45) Date of Patent: Sep. 3, 2024

(54) SYSTEM AND METHOD FOR USER AUTHENTICATION FOR INFORMATION SECURITY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 283 days.

(21) Appl. No.: 17/804,714

(22) Filed: May 31, 2022

(65) Prior Publication Data

US 2023/0388299 A1 Nov. 30, 2023

(51) Int. Cl.
*H04L 9/40* (2022.01)

(52) U.S. Cl.
CPC .............................. *H04L 63/0861* (2013.01)

(58) Field of Classification Search
CPC .................................................. H04L 63/0861
See application file for complete search history.

(56) References Cited

U.S. PATENT DOCUMENTS

| | | | |
|---|---|---|---|
| 6,898,609 B2 | 5/2005 | Kerwin | |
| 7,257,603 B2 | 8/2007 | Murman et al. | |
| 7,620,658 B2 | 11/2009 | Benson et al. | |
| 7,703,667 B2 | 4/2010 | Koorland et al. | |
| 7,775,885 B2 | 8/2010 | Van Luchene et al. | |
| 7,970,837 B2 | 6/2011 | Lyle et al. | |
| 8,063,929 B2 | 11/2011 | Kurtz et al. | |
| 8,140,340 B2 | 3/2012 | Bhogal et al. | |
| 8,154,578 B2 | 4/2012 | Kurtz et al. | |
| 8,154,583 B2 | 4/2012 | Kurtz et al. | |
| 8,159,519 B2 | 4/2012 | Kurtz et al. | |
| 8,203,561 B2 | 6/2012 | Carter et al. | |
| 8,219,616 B2 | 7/2012 | Dawson et al. | |
| 8,237,771 B2 | 8/2012 | Kurtz et al. | |
| 8,245,241 B2 | 8/2012 | Hamilton, II et al. | |
| 8,245,283 B2 | 8/2012 | Dawson et al. | |
| 8,253,770 B2 | 8/2012 | Kurtz et al. | |
| 8,274,544 B2 | 9/2012 | Kurtz et al. | |
| 8,386,918 B2 | 2/2013 | Do et al. | |
| 8,458,209 B2 | 6/2013 | Clarke | |
| 8,458,603 B2 | 6/2013 | Finn et al. | |
| 8,578,285 B2 | 11/2013 | Wetzer et al. | |
| 8,593,453 B2 | 11/2013 | Sharp et al. | |
| 8,650,096 B2 | 2/2014 | Van Buskirk et al. | |
| 8,751,626 B2 | 6/2014 | Pinkston et al. | |
| 8,751,948 B2 | 6/2014 | Wetzer et al. | |
| 8,935,359 B2 | 1/2015 | Carr et al. | |
| 8,990,705 B2 | 3/2015 | Finn et al. | |

(Continued)

*Primary Examiner* — Khoi V Le

(57) ABSTRACT

A system receives a request to authorize an interaction between a first avatar associated with a first user and a second avatar associated with a second user within a virtual environment. The system receives a request to verify the identity of the first user. The system receives an image of the first user and extracts facial features from the image. The system identifies a serial number and a user credential associated with the first user. The system generates a token based on the facial features, the serial number, and the user credential. The system verifies the identity of the first user based on the token. If the identity of the first user is verified, the system authorizes the interaction between the first avatar and the second avatar.

20 Claims, 3 Drawing Sheets

(56) References Cited

U.S. PATENT DOCUMENTS

| | | | |
|---|---|---|---|
| 9,235,319 B2 | 1/2016 | Finn et al. | |
| 9,238,172 B2 | 1/2016 | Relyea et al. | |
| 9,378,296 B2 | 6/2016 | Clarke | |
| 9,808,722 B2 | 11/2017 | Kawachiya et al. | |
| 9,864,742 B2 | 1/2018 | Chen et al. | |
| 9,875,580 B2 | 1/2018 | Cannon et al. | |
| 9,895,612 B2 | 2/2018 | Pacey et al. | |
| 10,242,032 B2 | 3/2019 | Sundaresan et al. | |
| 10,326,667 B2 | 6/2019 | Jones et al. | |
| 10,373,129 B1 | 8/2019 | James et al. | |
| 10,373,158 B1 | 8/2019 | James et al. | |
| 10,540,654 B1 | 1/2020 | James et al. | |
| 10,639,551 B2 | 5/2020 | Hamilton, II et al. | |
| 10,917,445 B2 | 2/2021 | Andon et al. | |
| 11,017,391 B1 | 5/2021 | Winklevoss et al. | |
| 11,235,530 B2 | 2/2022 | Kaltenbach et al. | |
| 11,831,409 B2 * | 11/2023 | Lindemann | H04L 9/0861 |
| 2005/0027713 A1 | 2/2005 | Cameron et al. | |
| 2008/0026847 A1 | 1/2008 | Mueller et al. | |
| 2008/0147424 A1 | 6/2008 | Rowan et al. | |
| 2008/0303811 A1 | 12/2008 | Van Luchene | |
| 2009/0170604 A1 | 7/2009 | Mueller et al. | |
| 2009/0254358 A1 | 10/2009 | Li et al. | |
| 2009/0303984 A1 | 12/2009 | Clark et al. | |
| 2011/0014985 A1 | 1/2011 | Park et al. | |
| 2011/0231781 A1 | 9/2011 | Betzler et al. | |
| 2014/0281850 A1 | 9/2014 | Prakash et al. | |
| 2015/0334562 A1 * | 11/2015 | Perold | H04W 12/06 713/186 |
| 2017/0259167 A1 | 9/2017 | Cook et al. | |

\* cited by examiner

SYSTEM AND METHOD FOR USER AUTHENTICATION FOR INFORMATION SECURITY

TECHNICAL FIELD

The present disclosure relates generally to information security, and more specifically to a system and method for user authentication for information security.

BACKGROUND

In a network environment, computing devices are in data communication with other computing devices that may be distributed anywhere in the world. These network environments allow data and information to be shared among these devices. Some of the technical challenges that occur when data is exchanged between devices are controlling data leakage, unauthorized access to data, and preventing malicious activities. Data storing computing devices, such as computers, laptops, augmented reality devices, virtual reality devices, and smartphones, are vulnerable to attacks. This vulnerability poses several network security challenges. Existing systems are typically unable to detect a network attack until after the attack has occurred. For example, a bad actor may connect to a computing device within a network environment which then allows the bad actor to gain unauthorized access to information that is stored in the computing device. The bad actor may also perform other malicious activities such as spoofing or pretending to be another user to gain access to other users' information.

SUMMARY

The system described in the present disclosure provides several practical applications and technical advantages that overcome the current technical problems as described herein. The following disclosure is particularly integrated into practical applications of improving the authentication of users within a virtual environment. This, in turn, provides an additional practical application of improving the information security technology and therefore improving the information security of computer systems that users use to access the virtual environment.

In an example operation, users may use avatars to access the virtual environment. In some cases, an avatar associated with a user may be hacked by a bad actor, e.g., via cyberattacks or any other type of code attack. Thus, the bad actor may gain unauthorized access to the avatar of the user in the virtual environment. If such unauthorized access to the avatar remains undetected, the bad actor can perform malicious actions, such as transferring virtual resources and/or virtual objects to another avatar (e.g., associated with themselves) within the virtual environment. This may be reflected in the real world. For example, in response to transferring virtual resources and/or virtual objects to another avatar that is associated with themselves, corresponding real-world resources and/or real-world objects may be transferred to a profile associated with the bad actor in the real world.

The disclosed system is configured to implement multi-factor authentication to verify the identity of the users operating avatars within the virtual environment. For example, the disclosed system may use an image of a user, a serial number associated with the user, and a user credential associated with the user to verify the identity of the user. The disclosed system may request to receive an image of the user and perform facial recognition on the image of the user.

The disclosed system may extract a set of features from the image of the user, where the set of features represents the physical attributes of the user shown in the image, such as facial features, hand gestures, etc.

The disclosed system may generate a non-mutable token based on the extracted features, the serial number, and user credentials associated with the user. The token may be a security artifact that uniquely identifies the user. This combination of authentication factors increases the complexity of hacking or gaining unauthorized access to an avatar and passing the authentication. This combination of factors further increases the complexity that is associated with spoofing a user to gain access to their personal information and/or to perform malicious activities on other users within a virtual environment.

This process may be employed to authenticate and validate the identity of a user before allowing the user to perform any kind of action or interaction within a virtual environment. In addition, this process provides information security to the overall computer system since it prevents bad actors from spoofing users within a virtual environment. Improving information security for the computer system also improves the underlying network and the devices within the network. For example, when a data exfiltration attack occurs, there is an increase in the number of network resources and bandwidth that are consumed which reduces the throughput of the network. By preventing data exfiltration attacks, the computer system can prevent any unnecessary increases in the number of network resources and bandwidth that are consumed that would otherwise negatively impact the throughput of the computer system. Thus, the disclosed processes improve the operation of the computer system overall.

Accordingly, the disclosed system is integrated into practical applications of improving the authentication of users within a virtual environment, providing improved information security to users within the virtual environment, and improving the information security of computer systems that users use to access the virtual environment.

In one embodiment, a system for user authentication within a virtual environment comprises a memory and a processor. The memory is configured to store user profiles, wherein each user profile associated with a respective user comprises at least one of an image, a user credential, and an profile number associated with the respective user. The processor is operably coupled to the memory. The processor receives a request to authorize an interaction between a first avatar and a second avatar in a virtual environment. The first avatar is associated with a first user in a real-world environment. The second avatar is associated with a second user in the real-world environment. The processor receives, from a computing device associated with the second user, a request to verify the identity of the first user. The processor receives, from a camera associated with the first user, a first image of the first user. The processor extracts a first set of features from the first image of the first user, wherein the first set of features represents physical attributes of the first user shown in the first image. The processor identifies a first profile number associated with the first user from among the user profiles. The processor identifies a first user credential associated with the first user from among the user profiles. The processor generates a non-mutable token based at least in part upon the first set of features, the first profile number, and the first user credential, wherein the non-mutable token comprises a security artifact that uniquely identifies the first user. The processor verifies the identity of the first user based at least in part upon the non-mutable token. In response to determining that the identity of the first user is verified, the processor authorizes the interaction between the first avatar and the second avatar.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
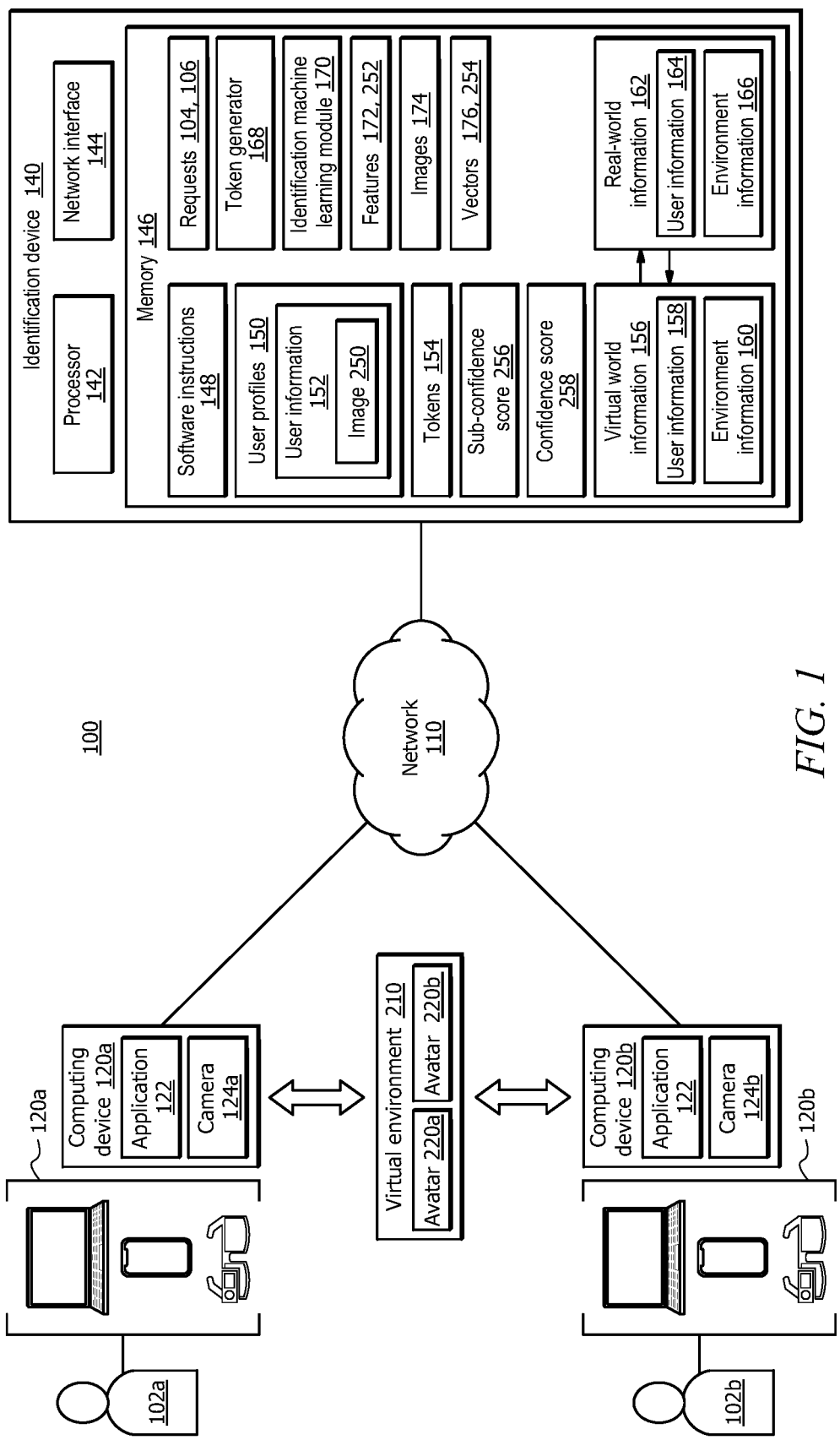
FIG. 1 illustrates an embodiment of a system configured to provide user authentication within a virtual environment.
Figure 2:
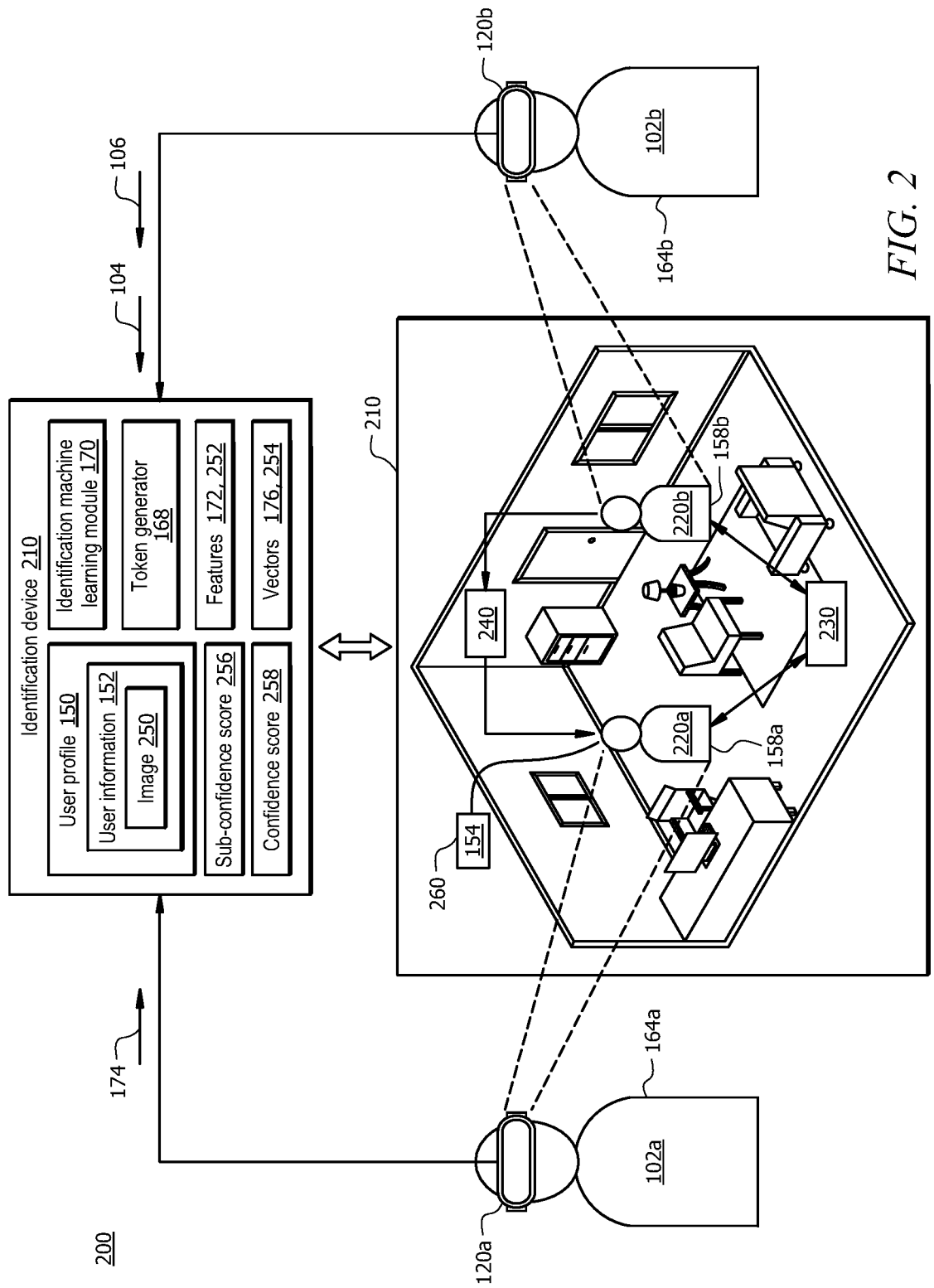
FIG. 2 illustrates an example operational flow of system of FIG. 1 for user authentication within a virtual environment.
Figure 3:
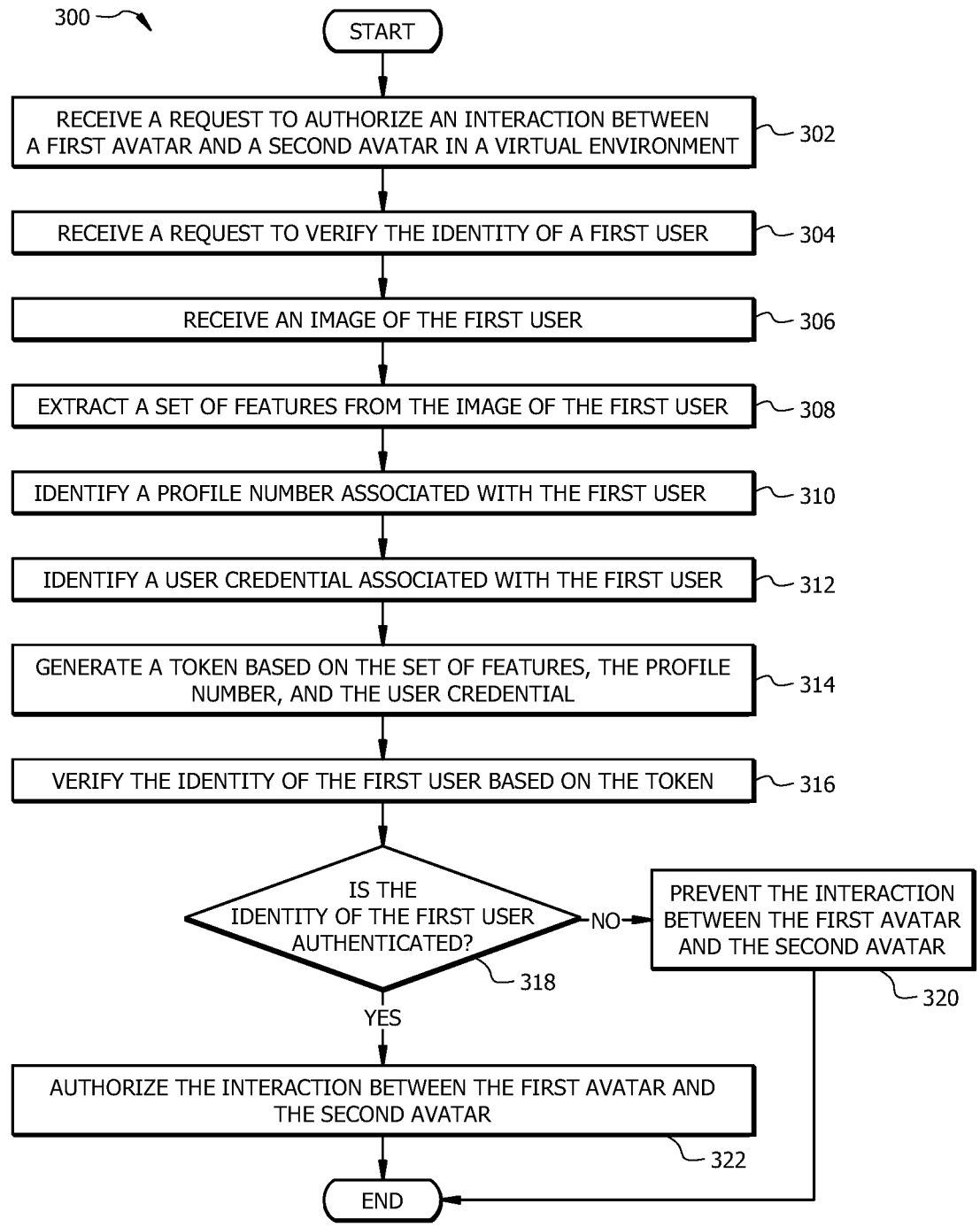
FIG. 3 illustrates an example flowchart of a method for user authentication within a virtual environment.

As described above, previous technologies fail to provide efficient and reliable solutions for user authentication within a virtual environment. Embodiments of the present disclosure and its advantages may be understood by referring to FIGS. 1 through 3. FIGS. 1 through 3 are used to describe a system and method for user authentication within a virtual environment.

System Overview

FIG. 1 illustrates an embodiment of a system 100 that is generally configured to provide information security and user authentication to users 102 within a virtual environment 210. For example, the computer system 100 may be configured to perform multifactor authentication that uses a combination of factors from both the real world and a virtual environment 210. This technology may be employed to authenticate a user before allowing the user to perform any kind of action or interaction within the virtual environment 210. This technology provides improved information security because it relies on a combination of factors that are associated with both the user in the real world and an avatar that is associated with the user in a virtual environment 210.

In certain embodiments, the system 100 comprises an identification device 140 operably coupled with one or more computing devices 120 (e.g., 120a and 120b) via a network 110. Network 110 enables the communication between the components of the system 100. Identification device 140 comprises a processor 142 in signal communication with a memory 146. Memory 146 stores software instructions 148 that when executed by the processor 142, cause the identification device 140 to perform one or more operations described herein. For example, when the software instructions 148 are executed, the identification device 140 determines the identity of a user 102 based on multifactor authentication factors and upon validation of the identity of the user 102, allows the user 102 to perform an interaction within the virtual environment 210 using their avatar 220. In other embodiments, system 100 may not have all of the components listed and/or may have other elements instead of, or in addition to, those listed above.

The system 100 may further be configured to perform a multifactor authentication to verify the identity of a user 102 based on a combination of user information 152 that includes biometric features and signals associated with the user 102 (e.g., facial features, hand gestures, retinal features, voice samples, fingerprint, pose estimation, etc.), a profile number (e.g., an account number) associated with the user 102, and user credentials associated with the user 102.

The system 100 may further be configured to generate a non-mutable token 154 based on the user information 152. The non-mutable token 154 may be a software token that is a security artifact that uniquely identifies the user 102. The system 100 may use the token 154 to verify the identity of the user 102. In response to verifying the identity of the user 102, the system 100 may allow the user 102 to perform an action within the virtual environment 210 (via the avatar 220 associated with the user 102, where the action may include performing an interaction with an avatar 220 associated with another user 102 in the virtual environment 210.

In certain embodiments, the system 100 may be configured to allow users 102 to transfer virtual resources and/or virtual objects among each other in the virtual environment 210. This process may reflect in the real world. For example, corresponding real-world resources and/or real-world objects may be transferred between the users 102 in the real world. This process also allows the users 102 to preview the effect of a transfer of real-world resources and virtual resources by determining and outputting the projected number of real-world resources and virtual resources before initiating an actual transfer of the resources between the users.

System Components

Network

Network 110 may be any suitable type of wireless and/or wired network. The network 110 is not connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network that is not connected to the Internet. The network 110 may be configured to support any suitable type of communication protocol as would be appreciated by one of ordinary skill in the art.

Computing Device

Each of the computing devices 120a and 120b is an instance of a computing device 120. Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, keypad, or other appropriate terminal equipment usable by user 102. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices via the network 110, such as the identification device 140.

Each computing device 120 includes and/or operably coupled with a camera 124. The computing device 120a is operably coupled with the camera 124a, and the computing device 120b is operably coupled with the camera 124b. The cameras 124a and 124b are instances of a camera 124. Camera 124 may be or include any camera that is configured to capture images of a field of view in front of the computing device 120. Examples of the camera 124 may include charge-coupled device (CCD) cameras and complementary metal-oxide semiconductor (CMOS) cameras. The camera 124 is configured to capture images 174 of a user 102 within a real environment. The camera 124 is a hardware device that is configured to capture images 174 continuously, at predetermined intervals, or on-demand. For example, the camera 124 is configured to receive a command from a user 102 to capture an image 174. In another example, the camera 124 is configured to continuously capture images 174 to form a video stream of images 174. The camera 124 may transmit the captured images 174 and/or video stream to the identification device 140.

Each computing device 120 is configured to display a two-dimensional (2D) or three-dimensional (3D) representation of a virtual environment 210 to a user. Examples of a virtual environment 210 include, but are not limited to, a graphical or virtual representation of a metaverse, a map, a city, a building interior, a landscape, a fictional location, an alternate reality, or any other suitable type of location or environment.

Virtual Environment

A virtual environment 210 may be configured to use realistic or non-realistic physics for the motion of objects within the virtual environment 210. For example, some virtual environments 210 may be configured to use gravity whereas other virtual environments 210 may be configured not to use gravity. Within the virtual environment 210, each user 102 may be associated with an avatar 220. An avatar 220 is a graphical representation of the user 102 within the virtual environment 210. Examples of avatars 220 include, but are not limited to, a person, an animal, or an object. In some embodiments, the features and characteristics of the avatar 220 may be customizable and user-defined. For example, the size, shape, color, attire, accessories, or any other suitable type of appearance features may be specified by a user 102. By using an avatar 220, a user 102 is able to move within the virtual environment 210 to interact with other avatars 220 and objects within the virtual environment 210.

Each computing device 120 is further configured to allow a user 102 to send requests to and generally communicate with the identification device 140. For example, a user 102 may use a computing device 120 to send a request 104 that requests to perform an interaction with an avatar 220 associated with user 102 in the virtual environment 210. An example of this process is described in more detail below in FIGS. 2-3.

The user 102 may use the computing device 120 to access the application 122. The application 122 may include interfaces that the user 102 can use to operate the avatar 220 in the virtual environment 210. The application 122 may be a web application, a software application, and/or a mobile application.

Identification Device

Identification device 140 is generally a hardware device that is configured to process data and communicate with other components of the system 100 via the network 110. The identification device 140 is further configured to provide services and software and/or hardware resources to computing devices 120. The identification device 140 is further configured to oversee the operations of the processor 142 as described further below and in conjunction with the operational flow 200 described in FIG. 2 and the method 300 described in FIG. 3.

Processor 142 comprises one or more processors operably coupled to the memory 146. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 148) to implement the processor 142. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of method 300 as described in FIG. 3.

Network interface 144 is configured to enable wired and/or wireless communications. The network interface 144 may be configured to communicate data between the identification device 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, user profiles 150, tokens 154, virtual world information 156, real-world information 162, requests 104, 106, token generator 168, identification machine learning module 170, features 172, 252, images 174, vectors 176, 254, sub-confidence scores 256, confidence score 258, and/or any other data or instructions. The software instructions 148 may comprise any suitable set of instructions, logic, rules, or code operable to execute the processor 142 and perform the functions described herein, such as some or all of those described in FIGS. 1-3.

The user profile 150 includes one or more user profiles each associated with a respective user 102. For example, the user profile 150 may include a plurality of user information 152 each associated with a respective user 102. The user information 152 associated with a user 102 may include an image of the user 102, a user credential (e.g., username and password to login and access the application 122 and thus the avatar 220 in the virtual environment 210), a profile number, a serial number associated with the user 102.

The virtual environment information 156 comprises user information 158 and environment information 160. The user information 158 generally comprises information that is associated with any accounts or profiles that can be used within a virtual environment 210. For example, user information 158 may comprise user profile information, online account information, avatar information, digital resources information, or any other suitable type of information that is associated with a user 102 and their avatar 220 within a virtual environment 210. The environment information 160 generally comprises information about the appearance of a virtual environment 210. For example, the environment information 160 may comprise information associated with objects, landmarks, buildings, structures, avatars, or any other suitable type of element that is present within a virtual environment 210. In some embodiments, the environment information 160 may be used to create a representation of a virtual environment 210 for users 102. In this case, a virtual environment 210 may be implemented using any suitable type of software framework or engine.

The real-world information 162 comprises user information 164 and environment information 166. The user information 164 generally comprises information that is associated with any accounts or profile that can be used within the real world. For example, user information 164 may comprise user profile information, account information, real world resource information, or any other suitable type of information that is associated with a user 102 within a real-world environment. The environment information 166 generally comprises information that is associated with an entity (e.g., organization) within the real world that the user 102 is a member of or is associated with. For example, the environment information 166 may comprise addresses, phone numbers, email addresses, contact names, or any other suitable type of information that is associated with an entity. Since the identification device 140 has access to both the virtual environment information 156 and the real-world information 162, the identification device 140 is able to link together the virtual environment information 156 and the real-world information 162 for a user 102 such that changes to the virtual environment information 156 affect or propagate to the real-world information 162 and vice-versa. For example, the identification device 140 may be configured to store one or more maps (e.g., actions of an avatar 220, interactions among avatars 220, gestures performed by an avatar 220, etc.) that translate or convert different types of interactions between the real world and the virtual environment 210 and vice-versa.

Token Generator

Token generator 168 may be implemented by the processor 142 executing the software instructions 148, and is generally configured to generate tokens 154. The token generator 168 is configured to generate a token 154 based on one or more user information 152. In certain embodiments, the token generator 168 may include a hashing algorithm that is configured to implement a hashing operation on one or more user information 152. In certain embodiments, the token generator 168 may include a hashing and/or an encryption algorithm that is configured to implement hashing and/or an encryption operation on one or more user information 152. The generated token 154 associated with a user 102 may be non-mutable—meaning that the generated token 154 cannot be modified. The generated token 154 may be unique to the user 102. The generated token 154 may include a security artifact (e.g., a serial number, an alpha-numerical string, a piece of code, an encrypted code, an obfuscated code, a hashed code, and/or the like) that uniquely identifies the user 102. The generated token 154 may be associated with a time-to-live parameter. For example, when the time-to-live parameter of the token 154 expires, the system 100 may receive another image 174 from the camera 124 associated with the user 102, extract another set of features 172 from the new image 174, and generate another token 154 based on the newly received information. The token generator 168 may perform a similar operation for other media items, such as a voice sample, a retinal signal, a fingerprint, etc., associated with a user 102.

Identification Machine Learning Module

Identification machine learning module 170 may be implemented by the processor 142 executing the software instructions 148, and is generally configured to extract biometric signals and features from the media items associated with a user 102, such as an image 174, a voice sample, a retinal signal, a fingerprint, etc.

In certain embodiments, the identification machine learning module 170 may be implemented by a plurality of neural network layers, convolutional neural network layers, Long-Short-Term-Memory (LSTM) layers, Bi-directional LSTM layers, recurrent neural network layers, and the like. In certain embodiments, the identification machine learning module 170 may be implemented by image processing, facial recognition, retinal data processing, fingerprint processing, audio speech processing, or any suitable technique to determine the identity of a user 102.

In certain embodiments, the identification machine learning module 170 may be configured to extract a set of features 172 from an image 174 of a user 102. The set of features 172 may represent the physical attributes of the user 102 which is shown in image 174. The set of features 172 may be represented by a first vector 176 comprising numerical values. The physical attributes of the user 102 may include facial features, hand gestures, retinal features, pose estimation, etc. In this process, the identification machine learning module 170 (e.g., via the identification device 140) may feed the image 174 to a neural network to extract the set of features 172. The set of features 172 may be included in the user information 152 associated with the user 102.

In certain embodiments, the identification machine learning module 170 may perform a similar operation on any media item, including an audio sample, a fingerprint, a retinal signal, and image frame associated with the user 102. For example, the identification machine learning module 170 may feed the media item to a neural network to extract features from it. The extracted features may be added to the user information 152 associated with the user 102. The identification device 140 may use this information in generating the token 154 for the user 102.

Example Operational Flow for User Authentication within a Virtual Environment

FIG. 2 illustrates an example operational flow 200 of system 100 of FIG. 1 for user authentication within the virtual environment 210. In some cases, the user credentials of the user 102 may be hacked by bad actors, e.g., via cyberattack or any other types of code attack. Thus, a bad actor may gain unauthorized access to the avatar 220a. If such unauthorized access to the avatar 220a remains undetected, the bad actor can perform malicious actions, such as transfer real-world resources, real-world objects, virtual resources, and/or virtual objects to another user 102 or another avatar 220 (e.g., to themselves) within the virtual environment 210. This may reflect in the real-world environment. Thus, system 100 of FIG. 1 is configured to determine the identity of the user 102 before allowing the user 102 to perform any action, operation, or interaction with other users 102 (via their avatars 220) in the virtual environment 210.

The operational flow 200 may begin when the user 102a operating the computing device 120a accesses the virtual environment 210. For example, the user 102a may log in using their credentials into the application 122 from the computing device 120a. The identification device 140 may load the virtual environment 210 such that it can be viewed and accessed from the computing device 120a. The user 102a may operate the avatar 220a in the virtual environment 210. Similarly, the second user 102b may also access the virtual environment 210 and operate the avatar 220b in the virtual environment 210. For example, assume that the first user 102a wants to receive real-world resources, real-world objects, virtual resources, and/or virtual objects (collectively referred to herein as virtual object 240) from the second user 102b within the virtual environment 210, and that the second user 102b wants to send the same to the first user 102a.

Before allowing the transfer or interaction between the first user 102a and the second user 102b, the system 100 of FIG. 1 (via the identification device 140) verifies the identity of the first user 102a and the second user 102b. The corresponding description below describes the operation of verifying the identity of the first user 102a. However, it is understood that a similar operation can be performed to verify the identity of the second user 102b. To verify the identity of the first user 102a, the identification device 140 may perform a multifactor authentication as described herein.

Receiving Input to Verify the Identity of a User

In an example operation, the identification device 140 receives a request 104 to authorize an interaction between the first avatar 220a and the second avatar 220b in the virtual environment 210. In certain embodiments, the interaction may include transferring a particular virtual resource 240 from a second user information 158b associated with the second user 102b to a first user information 158a associated with the first user 102a. Additionally or alternatively, the interaction may include transferring a particular virtual resource 240 from a second user information 164b associated with the second user 102b to a first user information 164a associated with the first user 102a. The particular virtual object 240 may be occupying a virtual memory associated with the second user information 158. After transferring the particular virtual object 240 to the first user information 158a, the particular virtual object 240 may be accessed from the first user information 158a by the first avatar 220a.

In certain embodiments, this may be reflected in the real world. For example, after transferring the particular virtual object 240 to the first user information 158a, a corresponding object in the real world may be transferred from the second user information 164b to the first user information 164a and can be accessed by the first user 102a.

The identification device 140 receives a request 106 to verify the identity of the first user 102a. In the illustrated embodiment, the identification device 140 receives the request 106 from the computing device 120b. In the same and/or other embodiments, the identification device 140 may receive the request 106 from the computing device 120a. In response to receiving the request 106, the identification device 140 may perform one or more operations below.

The identification device 140 may receive an image 174 of the first user 102a from the camera 124a associated with the first user 102a. The image 174 may be captured in real-time. The identification device 140 (e.g., via the identification machine learning module 170) may extract a set of features 172 from the image 174 of the first user 102a.

The identification device 140 identifies a first profile number (e.g., an account number, a serial number) associated with the first user 102a from among the user profiles 150. For example, the identification device 140 (e.g, via the identification machine learning module 170) may implement a facial recognition algorithm and search in the user profiles 150 to detect a user profile 150 that includes an image that shows the same person or user 102a. The identification device 140 may fetch the first profile number from the user profile 150 associated with the first user 102a. The identification device 140 may also identify a first user credential associated with the first user 102a that is included in the first user profile 150 associated with the first user 102a.

The identification device 140 may add the extracted features 172, identified profile number, and identified user credentials to the user information 164 associated with the user 102a.

In certain embodiments, the identification device 140 may add other biometric features and signals associated with the user 102a (e.g., facial features, hand gestures, retinal features, voice samples, fingerprint, pose estimation, etc.) to the user information 152 associated with the user 102a, and use that in generating the token 154.

In certain embodiments, the identification device 140 may add other information associated with the user 102a and/or the avatar 220a in the user information 152, 158, and/or 164 associated with the user 102a. For example, the identification device 140 may add historical behaviors of the avatar 220a, such as historical routes taken in the virtual environment 210, historical virtual places visited in the virtual environment 210, gestures and behavioral patterns (e.g., waving, jumping, running, running speed, waking, walking speed, hand gestures, facial expressions to particular media item stimuli, etc.) by the avatar 220a, gestures (e.g., hand gestures, facial expressions to particular media item stimuli, etc.) and behavioral patterns (e.g., actions performed by the user 102 operating the avatar 220a, typing speed, etc.), etc. to the user information 152 associated with the user 102a. In a particular example, to determine whether the avatar 220a is being accessed by the correct user 102a, one or more media item stimuli may be shown to the user 102a, the facial expressions of the user 102a may be captured from an image of the user 102a. To increase the accuracy in processing the facial expressions, determinants and cues of fatigue and stress may be detected and removed from the facial expressions. In another example, one or more media item stimuli may be shown to the user 102a, and the user 102a is expected to operate the avatar 220a based on pre-set set of maneuvers and movements. If the avatar 220a is operated according to the pre-set set of maneuvers and movements, it is determined that the avatar 220a is being operated by the correct user 102a and it validates the identity of the user 102a. This information may be included in the user information 152. In another example, the identification device 140 may add historical logging behavior of the first user 102a to the user information 152 associated with the user 102a. The identification device 140 may use the user information 152 to generate a unique and non-mutable token 154 that uniquely identifies the first user 102a.

Verifying the Identity of a User Based on a Token

The identification device 140 (e.g., via the token generator 168) may generate a unique and non-mutable token 154 based on one or more of the user information 152. In this process, the identification device 140 may feed the user information 152 to the token generator 168. The token generator 168 may perform a hashing operation, an encryption operation, and/or the like on the user information 152, and outputs a token 154.

The token 154 has information associated with the user information 152 associated with the user 102a. The identification device 140 verifies the identity of the first user 102a based on the generated token 154.

In certain embodiments, verifying the identity of the first user 102a may include determining that the first profile number corresponds to an initial profile number previously stored in the first user profile 150 associated with the first user 102a.

In certain embodiments, verifying the identity of the first user 102a may include determining that the first user credential corresponds to an initial user credential previously stored in the first user profile 150 associated with the first user 102a.

In certain embodiments, verifying the identity of the first user 102a may include performing an image processing operation on the image 174 received from the computing device 120a. In this process, the identification device 140 may access a second image 250 of the user 102a from the user profile 150 associated with the first user 102a, where the second image 250 was previously stored in the user information 152 and user profile 150 associated with the user 102a.

The identification device 140 (e.g., via the identification machine learning module 170) may extract a set of features 252 from the second image 250. The set of features 252 may represent the physical attributes of the first user 102a shown in the second image 250. The set of features 252 may be represented by a second vector 254 comprising numerical values.

The identification device 140 compares the first vector 176 with the second vector 254. In this process, the identification device 140 may perform a dot product between the vectors 176 and 254. The identification device 140 may determine the similarity between the vectors 176 and 254. The identification device 140 may calculate the Euclidian distance between the vectors 176 and 254. If the Euclidian distance between the vectors 176 and 254 is less than a threshold percentage, e.g., less than 1%, 2%, etc. the identification device 140 may determine that the user 102a in the image 174 is the same person as in the image 250.

In certain embodiments, the identification device 140 may determine a percentage of numerical values in the first vector 176 that correspond to a counterpart numerical values in the second vector 254. The identification device 140 may compare the determined parentage of numerical values in the first vector 176 that correspond to the counterpart numerical values in the second vector 254 with a threshold percentage (e.g., 90%, 95%, etc.).

If the identification device 140 determines that the determined percentage of numerical values exceeds the threshold percentage, it verifies the identity of the first user 102a (by determining that the user 102a in the image 174 is the same person as in the image 250.) For example, if identification device 140 determines that the user 102a in the image 174 is the same person as in the image 250, a sub-confidence score 256 associated with the identity of the user 102a may be increased by a percentage value (e.g., by 5%, 6%, etc.).

In certain embodiments, the identification device 140 may send a request indicating to provide the profile number and user credentials associated with the user 102a and the avatar 220a to the computing device 120a. The identification device 140 may receive the profile number and user credentials from the computing device 120a, and compare them to the initial profile number and the initial user credentials previously stored in the user profile 150 associated with the user 102a. The identification device 140 may verify the identity of the user 102a based on the comparison between the received profile number and initial profile number, and between the received user credential and the initial user credential. For example, if the received profile number matches the initial profile number, a sub-confidence score 256 associated with the identity of the user 102a may be increased by a percentage value (e.g., by 5%, 6%, etc.). In another example, if the received user credential matches the initial user credential, a sub-confidence score 256 associated with the identity of the user 102a may be increased by a percentage value (e.g., by 5%, 6%, etc.). The identification device 140 may determine the total confidence score 258 which indicates the probability of the validity of the identity of the user 102a by adding together or summing up the sub-confidence scores 256 for the authentication factors, including the images 174, 250, user information 152, etc. For example, the identification device 140 may determine that the identity of the first user 102a is authenticated if the total confidence score 258 is more than a threshold percentage, e.g., more than 90%, 95%, etc. The identification device 140 may perform a similar operation to verify the identity of the second user 102b.

In certain embodiments, upon verifying the identity of the users 102a-b, the identification device 140 may allow or authorize the interaction requested in the request 104. For example, the identification device 140 may establish a user session 230 between the first avatar 220a and the second avatar 220b. The user session 230 may indicate that the users 102a-b are verified and authorized to perform the interaction. The user session 230 may represent a trusted and secure communication between the avatars 220a-b.

In certain embodiments, the non-mutable token 154 may be associated with a time-to-live parameter 260. The time-to-live parameter 260 may indicate a particular time period that the token 154 is viable and can be used. The time-to-live parameter 260 may be five seconds, ten seconds, or any other suitable time duration.

In certain embodiments, the identification device 140 may further be configured to start a timer when the request 104 to authorize the interaction between avatars 220a-b is received. The identification device 140 may determine whether the identity of the first user 102a is verified before the time-to-live parameter 260 expires. If the identification device 140 determines that the identity of the first user 102a is verified before the time-to-live parameter 260 expires, the identification device 140 may authorize and perform the interaction requested in the request 104.

If the identification device 140 determines that the identity of the first user 102a is not verified before the time-to-live parameter 260 expires, the identification device 140 may request to receive, from the camera 124a, another image 174 of the first user 102a. The identification device 140 may process the newly received image 174, similar to that described above with respect to the first image 174. For example, the identification device 140 (via the identification machine learning module 170) may extract a new set of features 172 from the new image 174, where the new set of features 172 may represent the physical attributes of the first user 102a shown in the new image 174a. The identification device 140 may add the new set of features 172 to the user information 152. The identification device 140 may generate a second token 154 based on the updated user information 152. The identification device 140 may verify the identity of the first user 102a based on the second token 154, similar to that described above.

In certain embodiments, the token 154 may be represented as a virtual object in the virtual environment 210. In certain embodiments, verifying the identity of the first user 102a using the token 154 may include the identification device 140 sending the token 154 to the computing device 120a. The computing device 120a may generate a graphical representation of the token 154.

In certain embodiments, verifying the identity of the first user 102a using the token 154 may include the identification device 140 sending the token 154 to the computing device 120b. The computing device 120b may generate a graphical representation of the token 154.

In certain embodiments, the multifactor authentication to verify the identity of the first user 102a may include verifying one or more actions and/or attributes associated with the first user 102a. For example, the one or more actions and/or attributes may include a hand gesture (shown in the image 174), uttering a keyword in a microphone associated with the computing device 120a, etc. The identification device 140 may include this information in the user information 164a.

In certain embodiments, the multifactor authentication to verify the identity of the first user 102a may include verifying one or more actions and/or attributes associated with the first avatar 220a. For example, the one or more actions and/or attributes may include a gesture or action by the avatar 220a, etc. The identification device 140 may include this information in the user information 158a. In certain embodiments, the multifactor authentication to verify the identity of the first user 102a may include verifying the user information 164a and/or user information 158a.

Although the example operational flow 200 describes processing an image 174 of the first user 102a, in the same and other embodiments, any number of media items, including an image, retinal signal, voice sample, fingerprint, etc. may be processed, extract features from, and used in generating the token 154.

Example Method for User Authentication within a Virtual Environment

FIG. 3 illustrates an example flowchart of a method 300 for user authentication within a virtual environment 210.

Modifications, additions, or omissions may be made to method 300. Method 300 may include more, fewer, or other operations. For example, operations may be performed in parallel or in any suitable order. While at times discussed as the system 100, identification device 140, or components of any of thereof performing operations, any suitable system or components of the system may perform one or more operations of the method 300. For example, one or more operations of method 300 may be implemented, at least in part, in the form of software instructions 148 of FIG. 1, stored on non-transitory, tangible, machine-readable media (e.g., memories 146 of FIG. 1) that when run by one or more processors (e.g., processors 142 of FIG. 1) may cause the one or more processors to perform operations 302-322.

At operation 302, the identification device 140 receives a request 104 to authorize an interaction between a first avatar 220a and a second avatar 220b within a virtual environment 210. The first avatar 220a is associated with a first user 102a. The second avatar 220b is associated with a second user 102b. The identification device 140 may receive the request 104 from the first computing device 120a associated with the first user 102a and/or the second computing device 120b associated with the second user 102b, similar to that described in FIG. 2.

At operation 304, the identification device 140 receives a request 106 to verify the identity of the first user 102a. For example, the identification device 140 may receive the request 106 from the computing device 120b.

At operation 306, the identification device 140 receives an image 174 of the first user 102a. For example, the identification device 140 may receive the image 174 from the camera 124a.

At operation 308, the identification device 140 extracts a set of features 172 from the image 174 of the first user 102a. For example, the identification device 140 may feed the image 174 to the identification machine learning module 170 to extract the features 172, similar to that described in FIG. 2.

At operation 310, the identification device 140 identifies the profile number associated with the first user 102a. For example, the identification device 140 may search in the user profiles 150 to find the user profile 150 associated with the first user 102a. The user profile 150 associated with the first user 102a includes the user information 152 associated with the first user 102a that includes the profile number, user credentials, image, etc. associated with the first user 102a.

At operation 312, the identification device 140 identifies the user credential associated with the first user 102a, similar to that described in FIG. 2.

At operation 314, the identification device 140 generates a token 154 based on the set of features 172, the profile number, and the user credential associated with the first user 102a. In certain embodiments, the identification device 140 may include one or more other information about the user 102a and/or the avatar 220a as authentication factors in generating the token 154, similar to that described in FIG. 2.

At operation 316, the identification device 140 verifies the identity of the first user 102a based on the token 154, similar to that described in FIG. 2. For example, the identification device 140 may compare the received information (e.g., the image 174, features 172, etc.) with the exiting and historical records in the user profile 150 associated with the first user 102a. The identification device 140 may determine a sub-confidence score 256 for each authentication factor, e.g., the features 172, profile number, user credential, etc., similar to that described in FIG. 2.

At operation 318, the identification device 140 determines whether the identity of the first user 102a is authenticated based on the token 154. For example, the identification device 140 may determine that the identity of the first user 102a is authenticated if the total confidence score 258 is more than a threshold percentage, e.g., more than 90%, 95%, etc., similar to that described in FIG. 2. If the identification device 140 determines that the identity of the first user 102a is authenticated, method 300 proceeds to 322. Otherwise, method 300 proceeds to 320.

At operation 320, the identification device 140 prevents the interaction (requested in the request 104) between the first avatar 220a and the second avatar 220b. In certain embodiments, the identification device 140 may send an alert message to one or more of computing devices 120a, 120b, authorities, etc. For example, the authorities may initiate the investigation of the profile associated with the first user 102a used to access the virtual environment 210.

At operation 322, the identification device 140 authorizes the interaction (requested in the request 104) between the first avatar 220a and the second avatar 220b.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for user authentication within a virtual environment, comprising:
a memory configured to store user profiles, wherein each user profile associated with a respective user comprises at least one of an image, a user credential, and a profile number associated with the respective user;
a processor operably coupled with the memory, and configured to:
receive a request to authorize an interaction between a first avatar and a second avatar in a virtual environment, wherein:
the first avatar is associated with a first user in a real-world environment; and
the second avatar is associated with a second user in the real-world environment;
receive, from a computing device associated with the second user, a request to verify the identity of the first user;
receive, from a camera associated with the first user, a first image of the first user;
extract a first set of features from the first image of the first user, wherein the first set of features represents physical attributes of the first user shown in the first image;
identify a first profile number associated with the first user from among the user profiles;
identify a first user credential associated with the first user from among the user profiles;
generate a non-mutable token based at least in part upon the first set of features, the first profile number, and the first user credential, wherein the non-mutable token comprises a security artifact that uniquely identifies the first user;
verify the identity of the first user based at least in part upon the non-mutable token; and
in response to determining that the identity of the first user is verified, authorize the interaction between the first avatar and the second avatar.

2. The system of claim 1, wherein verifying the identity of the first user comprises determining that the first profile number corresponds to an initial profile number previously stored in a first user profile associated with the first user.

3. The system of claim 1, wherein verifying the identity of the first user comprises determining that the first user credential corresponds to an initial user credential previously set by the first user and stored in a first user profile associated with the first user.

4. The system of claim 1, wherein:
the first set of features is represented by a first vector comprising numerical values;
verifying the identity of the first user comprises:
accessing a second image of the first user from among images in the user profiles;
extracting a second set of features from the second image of the first user, wherein:
the second set of features is represented by a second vector comprising numerical values;
the second set of features represents physical attributes of the first user shown in the second image;
comparing the first vector with the second vector;
determining a percentage of numerical values in the first vector that correspond to counterpart numerical values in the second vector;
comparing the determined percentage of numerical values in the first vector that correspond to counterpart numerical values in the second vector to a threshold percentage; and
determining that the determined percentage of numerical values exceeds the threshold percentage.

5. The system of claim 1, wherein the physical attributes of the first user comprise biometric features of the first user that comprise at least one of facial features and hand gestures associated with the first user.

6. The system of claim 1, wherein generating the non-mutable token comprises performing a hashing operation on the first set of features, the first profile number, and the first user credential.

7. The system of claim 1, wherein:
the non-mutable token is associated with a time-to-live parameter;
the processor is further configured to:

start a timer when the request to authorize the interaction is received;
determine whether the identity of the first user is verified before the time-to-live parameter expires;
in response to determining that the identity of the first user is verified before the time-to-live parameter expires, authorize the interaction between the first avatar and the second avatar;
in response to determining that the identity of the first user is not verified before the time-to-live parameter expires:
receive, from the camera, a third image of the first user;
extract a third set of features from the third image of the first user, wherein the third set of features represents physical attributes of the first user shown in the third image;
generate a second non-mutable token based at least in part upon the third set of features, the first profile number, and the first user credential; and
verify the identity of the first user based at least in part upon the second non-mutable token.

8. A method for user authentication within a virtual environment, comprising:
receiving a request to authorize an interaction between a first avatar and a second avatar in a virtual environment, wherein:
the first avatar is associated with a first user in a real-world environment; and
the second avatar is associated with a second user in the real-world environment;
receiving, from a computing device associated with the second user, a request to verify the identity of the first user;
receiving, from a camera associated with the first user, a first image of the first user;
extracting a first set of features from the first image of the first user, wherein the first set of features represents physical attributes of the first user shown in the first image;
identifying a first profile number associated with the first user from among user profiles, wherein each user profile associated with a respective user from the user profiles comprises at least one of an image, a user credential, and a profile number associated with the respective user;
identifying a first user credential associated with the first user from among the user profiles;
generating a non-mutable token based at least in part upon the first set of features, the first profile number, and the first user credential, wherein the non-mutable token comprises a security artifact that uniquely identifies the first user;
verifying the identity of the first user based at least in part upon the non-mutable token; and
in response to determining that the identity of the first user is verified, authorizing the interaction between the first avatar and the second avatar.

9. The method of claim 8, wherein verifying the identity of the first user comprises determining that the first profile number corresponds to an initial profile number previously stored in a first user profile associated with the first user.

10. The method of claim 8, wherein verifying the identity of the first user comprises determining that the first user credential corresponds to an initial user credential previously set by the first user and stored in a first user profile associated with the first user.

11. The method of claim 8, wherein:
the first set of features is represented by a first vector comprising numerical values;
verifying the identity of the first user comprises:
accessing a second image of the first user from among images in the user profiles;
extracting a second set of features from the second image of the first user, wherein:
the second set of features is represented by a second vector comprising numerical values;
the second set of features represents physical attributes of the first user shown in the second image;
comparing the first vector with the second vector;
determining a percentage of numerical values in the first vector that correspond to counterpart numerical values in the second vector;
comparing the determined percentage of numerical values in the first vector that correspond to counterpart numerical values in the second vector to a threshold percentage; and
determining that the determined percentage of numerical values exceeds the threshold percentage.

12. The method of claim 8, wherein the physical attributes of the first user comprise biometric features of the first user that comprise at least one of facial features and hand gestures associated with the first user.

13. The method of claim 8, wherein generating the non-mutable token comprises performing a hashing operation on the first set of features, the first profile number, and the first user credential.

14. The method of claim 8, wherein:
the non-mutable token is associated with a time-to-live parameter;
the method further comprising:
starting a timer when the request to authorize the interaction is received;
determining whether the identity of the first user is verified before the time-to-live parameter expires;
in response to determining that the identity of the first user is verified before the time-to-live parameter expires, authorizing the interaction between the first avatar and the second avatar;
in response to determining that the identity of the first user is not verified before the time-to-live parameter expires:
receiving, from the camera, a third image of the first user;
extracting a third set of features from the third image of the first user, wherein the third set of features represents physical attributes of the first user shown in the third image;
generating a second non-mutable token based at least in part upon the third set of features, the first profile number, and the first user credential; and
verifying the identity of the first user based at least in part upon the second non-mutable token.

15. A non-transitory computer-readable medium storing instructions that when executed by a processor, cause the processor to:
receive a request to authorize an interaction between a first avatar and a second avatar in a virtual environment, wherein:
the first avatar is associated with a first user in a real-world environment; and
the second avatar is associated with a second user in the real-world environment;

receive, from a computing device associated with the second user, a request to verify the identity of the first user;

receive, from a camera associated with the first user, a first image of the first user;

extract a first set of features from the first image of the first user, wherein the first set of features represents physical attributes of the first user shown in the first image;

identify a first profile number associated with the first user from among user profiles, wherein each user profile associated with a respective user from the user profiles comprises at least one of an image, a user credential, and a profile number associated with the respective user;

identify a first user credential associated with the first user from among the user profiles;

generate a non-mutable token based at least in part upon the first set of features, the first profile number, and the first user credential, wherein the non-mutable token comprises a security artifact that uniquely identifies the first user;

verify the identity of the first user based at least in part upon the non-mutable token; and in response to determining that the identity of the first user is verified, authorize the interaction between the first avatar and the second avatar.

16. The non-transitory computer-readable medium of claim 15, wherein verifying the identity of the first user comprises determining that the first profile number corresponds to an initial profile number previously stored in a first user profile associated with the first user.

17. The non-transitory computer-readable medium of claim 15, wherein verifying the identity of the first user comprises determining that the first user credential corresponds to an initial user credential previously set by the first user and stored in a first user profile associated with the first user.

18. The non-transitory computer-readable medium of claim 15, wherein:

the first set of features is represented by a first vector comprising numerical values;

verifying the identity of the first user comprises:

accessing a second image of the first user from among images in the user profiles;

extracting a second set of features from the second image of the first user, wherein:

the second set of features is represented by a second vector comprising numerical values;

the second set of features represents physical attributes of the first user shown in the second image;

comparing the first vector with the second vector;

determining a percentage of numerical values in the first vector that correspond to counterpart numerical values in the second vector;

comparing the determined percentage of numerical values in the first vector that correspond to counterpart numerical values in the second vector to a threshold percentage; and determining that the determined percentage of numerical values exceeds the threshold percentage.

19. The non-transitory computer-readable medium of claim 15, wherein the physical attributes of the first user comprise biometric features of the first user that comprise at least one of facial features and hand gestures associated with the first user.

20. The non-transitory computer-readable medium of claim 16, wherein:

the interaction between the first avatar and the second avatar comprises transferring a particular virtual object from a second user profile to the first user profile;

the first user profile is associated with the first user;

the second user profile is associated with the second user;

the particular virtual object is occupying a virtual memory associated with the second user profile; and after transferring the particular virtual object to the first user profile, the particular virtual object can be accessed from the first user profile by the first avatar in the virtual environment.

* * * * *